United States Patent
Yavid et al.

(10) Patent No.: US 7,352,499 B2
(45) Date of Patent: Apr. 1, 2008

(54) ARRANGEMENT FOR AND METHOD OF PROJECTING AN IMAGE WITH PIXEL MAPPING

(75) Inventors: Dmitriy Yavid, Stony Brook, NY (US); Richard Rizza, N Bellmore, NY (US); Daniel Borges DeLazari, Ribeirao Preto (BR); Michael Slutsky, East Setauket, NY (US); Askold Strat, Sound Beach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 94 days.

(21) Appl. No.: 11/447,583

(22) Filed: Jun. 6, 2006

(65) Prior Publication Data

US 2007/0279722 A1    Dec. 6, 2007

(51) Int. Cl.
*G02B 26/08* (2006.01)
(52) U.S. Cl. ............... 359/198; 359/199; 359/201; 359/202; 359/204; 359/900; 348/744

(58) Field of Classification Search ............... None
See application file for complete search history.

(56) References Cited

U.S. PATENT DOCUMENTS 5,777,608 A * 7/1998 Lipovski et al. ............ 345/519
7,130,095 B1 * 10/2006 Wood ......................... 359/202

* cited by examiner

Primary Examiner—James Phan
(74) Attorney, Agent, or Firm—Kirschstein, et al.

(57) ABSTRACT

A laser beam is swept by a scan mirror as a pattern of scan lines on a projection surface. The scan mirror moves at a variable speed along each scan line. Each scan line has a number of pixels. The pixels have time durations proportional to the variable speed of the scan mirror. A profile memory stores the time durations of the pixels. A controller causes selected pixels arranged along each scan line to be illuminated for the time durations stored by the profile memory to produce an image of uniform brightness and of uniformly sized pixels and in color.

19 Claims, 7 Drawing Sheets

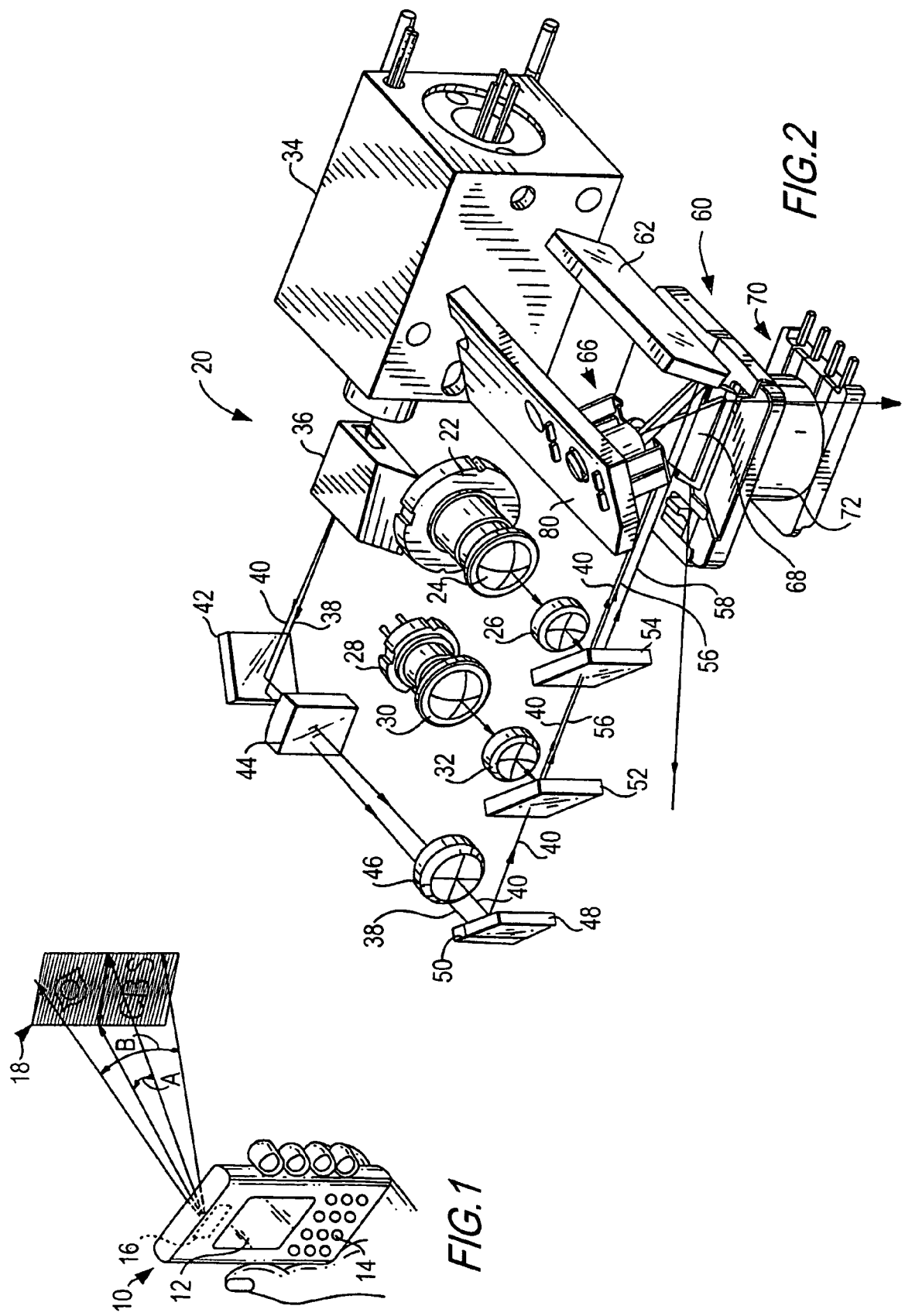

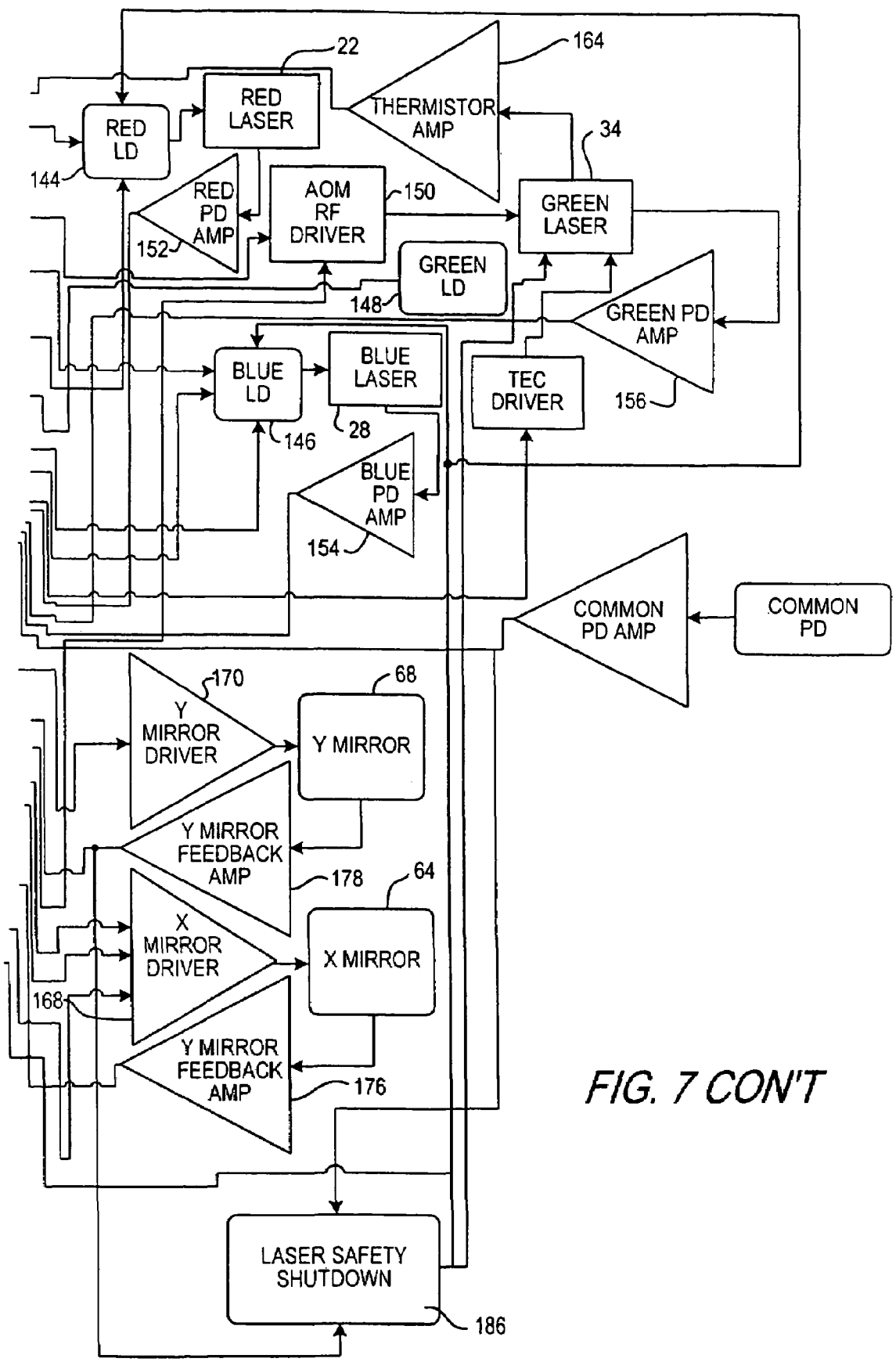
FIG. 7 CON'T

ARRANGEMENT FOR AND METHOD OF PROJECTING AN IMAGE WITH PIXEL MAPPING

BACKGROUND OF THE INVENTION

1. Field of the Invention

The present invention generally relates to projecting a two-dimensional image of high quality especially in color.

2. Description of the Related Art

It is generally known to project a two-dimensional image on a projection surface based on a pair of scan mirrors which oscillate in mutually orthogonal directions to scan a laser beam over a raster pattern comprised of a plurality of scan lines. The image is created in the raster pattern by energizing or pulsing a laser on and off at selected times, thereby illuminating selected pixels with a beam spot and not illuminating other pixels in each scan line. The number of distinct beam spots or pixels that can fit in each scan line is known as the resolution.

One of the scan mirrors, sometimes referred to herein as an X-mirror, sweeps the laser beam at a relatively faster speed generally along a scan direction extending along the horizontal, and the other of the scan mirrors, sometimes referred to herein as a Y-mirror, sweeps the scan line at a relatively slower speed generally perpendicular to the scan direction extending along the vertical. The X-mirror is oscillated, typically at resonance, at a scan frequency and at a speed that varies along each scan line. Thus, the X-mirror has a maximum speed at the center of each scan line and a minimum speed at the ends of each scan line.

The variable speed of the X-mirror causes the pixels to have variable time durations in order to obtain pixels of the same size on the projection surface. The variable speed of the X-mirror also causes the pixels to have a variable brightness, that is, the projected image appears brighter at those pixels where the X-mirror has a slower speed. These variable time durations and the variable brightness must be taken into account in order to project the image with uniformly sized pixels and uniform brightness.

SUMMARY OF THE INVENTION

OBJECTS OF THE INVENTION

Accordingly, it is a general object of this invention to provide an image projection arrangement that projects a two-dimensional image, especially in color, with uniformly sized pixels and uniform brightness in accordance with the method of this invention.

An additional object is to provide a miniature, compact, lightweight, and portable color image projection module useful in many instruments of different form factors.

FEATURES OF THE INVENTION

In keeping with these objects and others, which will become apparent hereinafter, one feature of this invention resides, briefly stated, in an image projection arrangement for, and a method of, projecting a two-dimensional image of high quality, especially in color. The arrangement includes a laser assembly for generating a laser beam; a scanner for sweeping the laser beam as a pattern of scan lines on a projection surface at a distance from the laser assembly, each scan line having a number of pixels; and a controller operatively connected to the laser assembly and the scanner, for causing selected pixels to be illuminated, and rendered visible, by the laser beam to produce the image.

In accordance with one aspect of this invention, the scanner includes a scan mirror, i.e., the X-mirror, movable at a speed that varies along each scan line. The pixels have respective time durations proportional to the variable speed of the X-mirror in order to obtain pixels of the same size on the projection surface. Hence, to take such variable time durations into account, a profile memory is provided for storing the time durations of the pixels. The controller is operatively connected to the profile memory to cause the selected pixels to be illuminated for the time durations stored in the profile memory.

The time durations can be stored only for a single representative scan line, for example, the center scan line, in which case, the stored time durations for the representative scan line are applied to all of the other scan lines; however, this leads to errors particularly at the upper and lower regions of the raster scan which are furthest from the center scan line. Alternatively, the time durations can be stored for all of the scan lines; however, this requires a multitude of storage locations for the profile memory. Preferably, to minimize the memory storage requirement, the time durations are stored for a single scan line, such as the center scan line, and then only the differences with the adjacent scan lines are stored in succession for all the scan lines.

As discussed above, the brightness of the image varies with the time durations, that is, the projected image appears brighter at those pixels where the X-mirror has a slower speed. In further accordance with this invention, the stored time durations are inverted (the brightness is inversely related to the time durations), and the controller generates a brightness compensation signal. This signal is then multiplied with the incoming video data to ensure that each pixel has the same brightness.

In the preferred embodiment, the laser assembly includes a plurality of lasers for respectively generating a plurality of laser beams of different wavelengths, for example, red, blue and green laser beams, and an optical assembly for focusing and nearly collinearly arranging the laser beams to form the laser beam as a composite beam which is directed to the scan mirror. The scan mirror is operative for sweeping the composite beam along a first direction at a first scan rate and over a first scan angle. Another oscillatable scan mirror is operative for sweeping the composite beam along a second direction substantially perpendicular to the first direction, and at a second scan rate different from the first scan rate, and at a second scan angle different from the first scan angle. At least one of the scan mirrors is oscillated by an inertial drive.

The controller includes means for energizing the lasers to illuminate the selected pixels for the time durations stored in the profile memory, and for deenergizing the lasers to non-illuminate pixels other than the selected pixels. The controller also includes means for effectively aligning the laser beams collinearly by delaying turning on and off the pixels of each of the laser beams relative to each other.

The support, lasers, scan mirrors, controller and optical assembly preferably occupy a volume of about seventy cubic centimeters, thereby constituting a compact module, which is interchangeably mountable in housings of different form factors, including, but not limited to, a pen-shaped, gun-shaped or flashlight-shaped instrument, a personal digital assistant, a pendant, a watch, a computer, and, in short, any shape due to its compact and miniature size. The projected image can be used for advertising or signage purposes, or for a television or computer monitor screen, and, in short, for any purpose desiring something to be displayed.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a hand-held instrument projecting an image at a working distance therefrom;

FIG. 2 is an enlarged, overhead, perspective view of an image projection arrangement in accordance with this invention for installation in the instrument of FIG. 1;

DETAILED DESCRIPTION OF THE PREFERRED EMBODIMENTS

Figure 3:
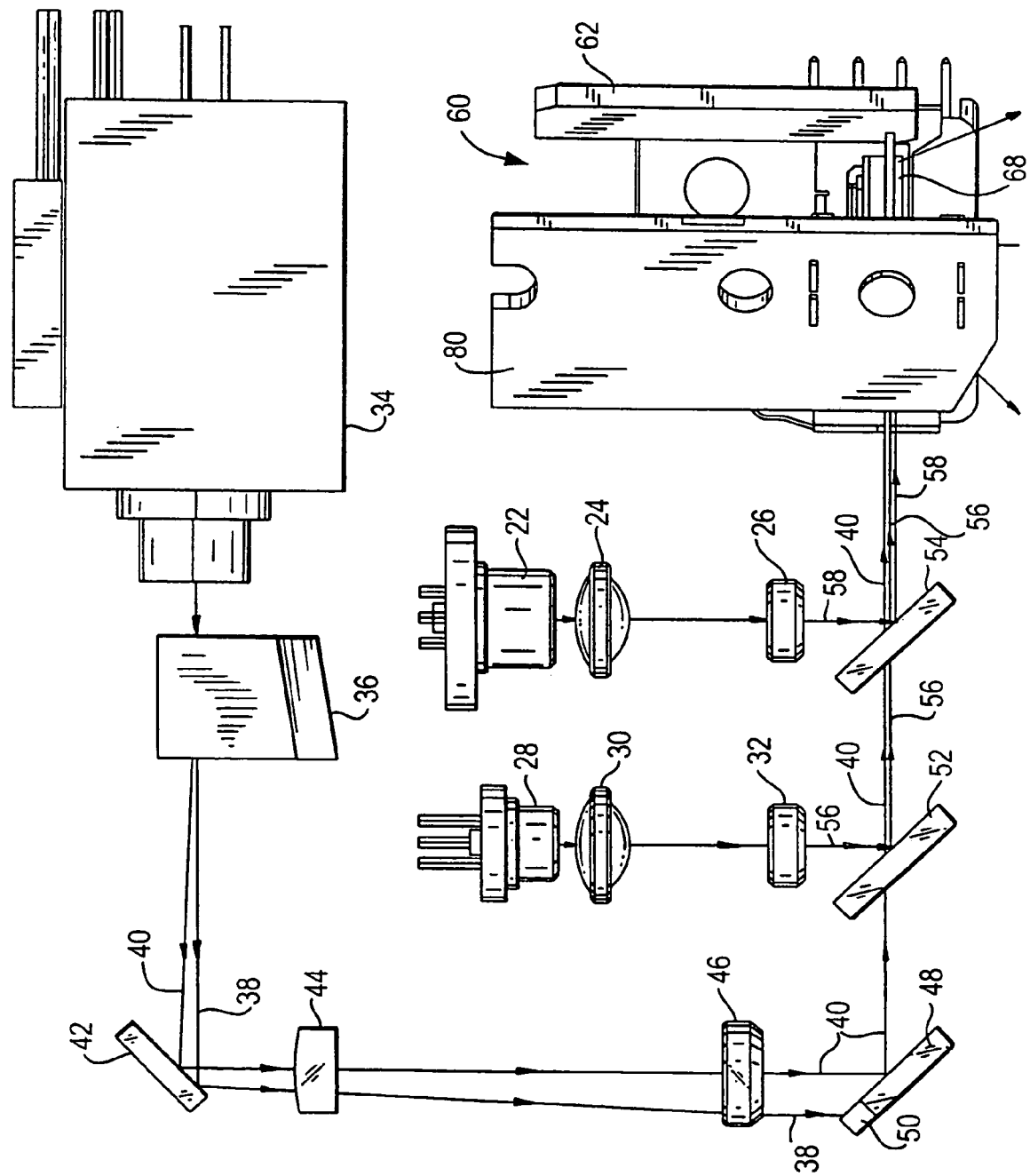
FIG. 3 is a top plan view of the arrangement of FIG. 2.

Reference numeral 10 in FIG. 1 generally identifies a hand-held instrument, for example, a personal digital assistant, in which a lightweight, compact, image projection arrangement 20, as shown in FIG. 2, is mounted and operative for projecting a two-dimensional color image on a projection surface at a variable distance from the instrument. By way of example, an image 18 is situated within a viewing range of distances relative to the instrument 10.

As shown in FIG. 1, the image 18 extends over an optical horizontal scan angle A extending along the horizontal direction, and over an optical vertical scan angle B extending along the vertical direction, of the image. As described below, the image is comprised of illuminated and non-illuminated pixels on a raster pattern of scan lines swept by a scanner in the arrangement 20.

The parallelepiped shape of the instrument 10 represents just one form factor of a housing in which the arrangement 20 may be implemented. The instrument can be shaped with many different form factors, such as a pen, a cellular telephone, a clamshell or a wristwatch.

In the preferred embodiment, the arrangement 20 measures about seventy cubic centimeters in volume. This compact, miniature size allows the arrangement 20 to be mounted in housings of many diverse shapes, large or small, portable or stationary, including some having an on-board display 12, a keypad 14, and a window 16 through which the image is projected.

Referring to FIGS. 2 and 3, the arrangement 20 includes a solid-state, preferably a semiconductor laser 22 which, when energized, emits a bright red laser beam at about 635-655 nanometers. Lens 24 is a bi-aspheric convex lens having a positive focal length and is operative for collecting virtually all the energy in the red beam and for producing a diffraction-limited beam. Lens 26 is a concave lens having a negative focal length. Lenses 24, 26 are held by non-illustrated respective lens holders apart on a support (not illustrated in FIG. 2 for clarity) inside the instrument 10. The lenses 24, 26 shape the red beam profile over the working distance.

Another solid-state, semiconductor laser 28 is mounted on the support and, when energized, emits a diffraction-limited blue laser beam at about 440 nanometers. Another bi-aspheric convex lens 30 and a concave lens 32 are employed to shape the blue beam profile in a manner analogous to lenses 24, 26.

A green laser beam having a wavelength on the order of 532 nanometers is generated not by a semiconductor laser, but instead by a green module 34 having an infrared diode-pumped, Nd-doped, YAG crystal laser whose output beam at 1064 nanometers. A non-linear frequency doubling crystal is included in the infrared laser cavity between two laser mirrors. Since the infrared laser power inside the cavity is much larger than the power coupled outside the cavity, the frequency doubler is more efficient in generating the double frequency green light inside the cavity. The output mirror of the laser is reflective to the 1064 nm infrared radiation, and transmissive to the doubled 532 nm green laser beam. Since the correct operation of the solid-state laser and frequency doubler require precise temperature control, a semiconductor device relying on the Peltier effect is used to control the temperature of the green laser module. The thermoelectric cooler can either heat or cool the device depending on the polarity of the applied current. A thermistor is part of the green laser module in order to monitor its temperature. The readout from the thermistor is fed to a controller, which adjusts the control current to the thermoelectric cooler accordingly.

As explained below, the lasers are pulsed in operation at frequencies on the order of 100 MHz. The red and blue semiconductor lasers 22, 28 can be pulsed directly via the applied drive currents at such high frequencies, but the currently available green solid-state lasers cannot. As a result, the green laser beam exiting the green module 34 is pulsed with an acousto-optical modulator (AOM) 36 that creates an acoustic traveling wave inside a crystal for diffracting the green beam. The AOM 36, however, produces a zero-order, non-diffracted beam 38 and a first-order, pulsed, diffracted beam 40. The beams 38, 40 diverge from each other and, in order to separate them to eliminate the undesirable zero-order beam 38, the beams 38, 40 are routed along a long, folded path having a folding mirror 42. Alternatively, the AOM can be used internally to the green laser module to pulse the green laser beam. Other possible ways to modulate the green laser beam include electro-absorption modulation, or a Mach-Zender interferometer. The beams 38, 40 are routed through positive and negative lenses 44, 46. However, only the diffracted green beam 40 is allowed to impinge upon, and reflect from, the folding mirror 48. The non-diffracted beam 38 may be absorbed by an absorber 50, preferably mounted on the mirror 48, or can be used for another useful function.

The arrangement includes a pair of dichroic filters 52, 54 arranged to make the green, blue and red beams as collinear as possible before reaching a scanning assembly 60. Filter 52 allows the green beam 40 to pass therethrough, but the blue beam 56 from the blue laser 28 is reflected by the interference effect. Filter 54 allows the green and blue beams 40, 56 to pass therethrough, but the red beam 58 from the red laser 22 is reflected by the interference effect.

Figure 4:
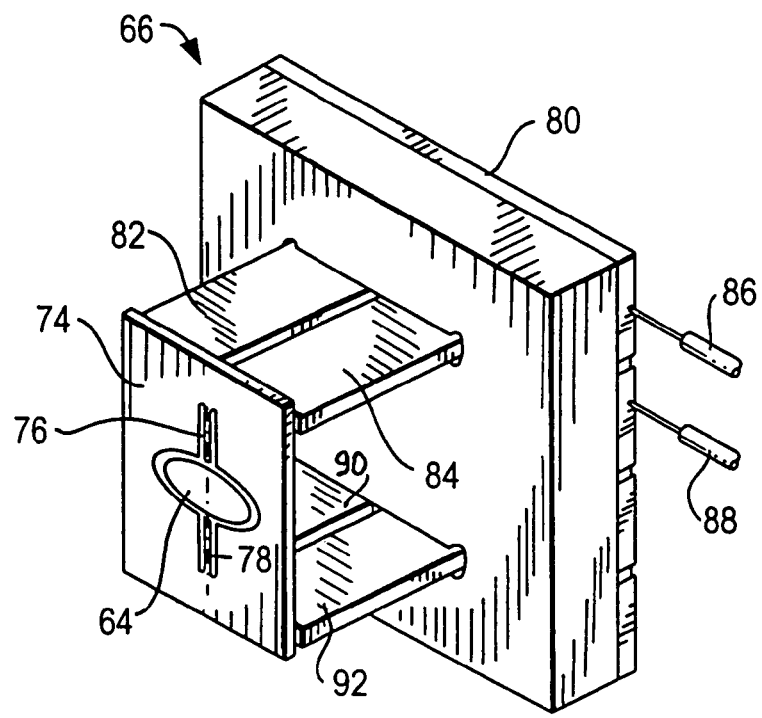
FIG. 4 is a perspective front view of an inertial drive for use in the arrangement of FIG. 2.
Figure 5:
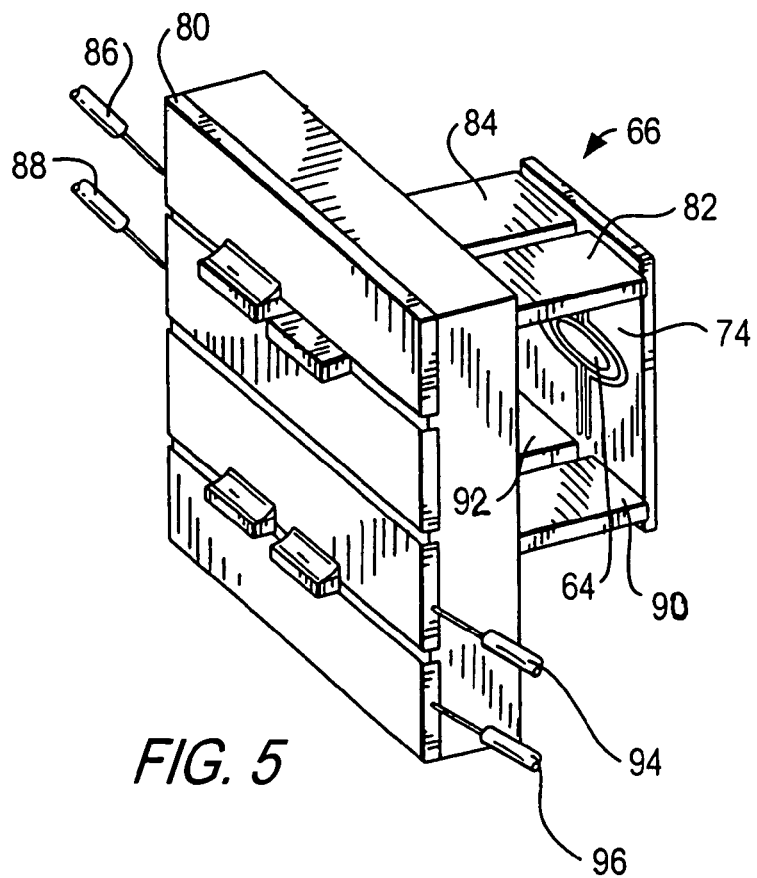
FIG. 5 is a perspective rear view of the inertial drive of FIG. 4.

The nearly collinear beams 40, 56, 58 are directed to, and reflected off, a stationary fold mirror 62. The scanning assembly 60 includes a first scan mirror 64 oscillatable by an inertial drive 66 (shown in isolation in FIGS. 4-5) at a first scan rate to sweep the laser beams reflected off the fold mirror 62 over the first horizontal scan angle A, and a second scan mirror 68 oscillatable by an electromagnetic drive 70 at a second scan rate to sweep the laser beams reflected off the first scan mirror 64 over the second vertical scan angle B. In a variant construction, the scan mirrors 64, 68 can be replaced by a single two-axis mirror.

The inertial drive 66 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the scanning assembly 60 to less than one watt and, in the case of projecting a color image, as described below, to less than ten watts.

The drive 66 includes a movable frame 74 for supporting the scan mirror 64 by means of a hinge that includes a pair of collinear hinge portions 76, 78 extending along a hinge axis and connected between opposite regions of the scan mirror 64 and opposite regions of the frame. The frame 74 need not surround the scan mirror 64, as shown.

The frame, hinge portions and scan mirror are fabricated of an integral, generally planar, silicon substrate, which is approximately 150 microns thick. The silicon is etched to form omega-shaped slots having upper parallel slot sections, lower parallel slot sections, and U-shaped central slot sections. The scan mirror 64 preferably has an oval shape and is free to move in the slot sections. In the preferred embodiment, the dimensions along the axes of the oval-shaped scan mirror measure 749 microns×1600 microns. Each hinge portion measures 27 microns in width and 1130 microns in length. The frame has a rectangular shape measuring 3100 microns in width and 4600 microns in length.

The inertial drive is mounted on a generally planar, printed circuit board 80 and is operative for directly moving the frame and, by inertia, for indirectly oscillating the scan mirror 64 about the hinge axis. One embodiment of the inertial drive includes a pair of piezoelectric transducers 82, 84 extending perpendicularly of the board 80 and into contact with spaced apart portions of the frame 74 at either side of hinge portion 76. An adhesive may be used to insure a permanent contact between one end of each transducer and each frame portion. The opposite end of each transducer projects out of the rear of the board 80 and is electrically connected by wires 86, 88 to a periodic alternating voltage source (not shown).

In use, the periodic signal applies a periodic drive voltage to each transducer and causes the respective transducer to alternatingly extend and contract in length. When transducer 82 extends, transducer 84 contracts, and vice versa, thereby simultaneously pushing and pulling the spaced apart frame portions and causing the frame to twist about the hinge axis. The drive voltage has a frequency corresponding to the resonant frequency of the scan mirror. The scan mirror is moved from its initial rest position until it also oscillates about the hinge axis at the resonant frequency. In a preferred embodiment, the frame and the scan mirror are about 150 microns thick, and the scan mirror has a high Q factor. A movement on the order of 1 micron by each transducer can cause oscillation of the scan mirror at scan angles in excess of 15 degrees.

Another pair of piezoelectric transducers 90, 92 extends perpendicularly of the board 80 and into permanent contact with spaced apart portions of the frame 74 at either side of hinge portion 78. Transducers 90, 92 serve as feedback devices to monitor the oscillating movement of the frame and to generate and conduct electrical feedback signals along wires 94, 96 to a feedback control circuit (not shown).

Although light can reflect off an outer surface of the scan mirror, it is desirable to coat the surface of the mirror 64 with a specular coating made of gold, silver, aluminum, or a specially designed highly reflective dielectric coating.

The electromagnetic drive 70 includes a permanent magnet jointly mounted on and behind the second scan mirror 68, and an electromagnetic coil 72 operative for generating a periodic magnetic field in response to receiving a periodic drive signal. The coil 72 is adjacent the magnet so that the periodic field magnetically interacts with the permanent field of the magnet and causes the magnet and, in turn, the second scan mirror 68 to oscillate.

The inertial drive 66 oscillates the scan mirror 64 at a high speed at a scan rate preferably greater than 5 kHz and, more particularly, on the order of 18 kHz or more. This high scan rate is at an inaudible frequency, thereby minimizing noise and vibration. The electromagnetic drive 70 oscillates the scan mirror 68 at a slower scan rate on the order of 40 Hz which is fast enough to allow the image to persist on a human eye retina without excessive flicker.

The faster mirror 64 sweeps a generally horizontal scan line, and the slower mirror 68 sweeps the generally horizontal scan line vertically, thereby creating a raster pattern which is a grid or sequence of roughly parallel scan lines from which the image is constructed. Each scan line has a number of pixels. The image resolution is preferably XGA quality of 1024×768 pixels. Over a limited working range, a high-definition television standard, denoted 720*p*, 1270× 720 pixels, can be obtained. In some applications, a one-half VGA quality of 320×480 pixels, or one-fourth VGA quality of 320×240 pixels, is sufficient. At minimum, a resolution of 160×160 pixels is desired.

The roles of the mirrors 64, 68 could be reversed so that mirror 68 is the faster, and mirror 64 is the slower. Mirror 64 can also be designed to sweep the vertical scan line, in which event, mirror 68 would sweep the horizontal scan line. Also, the inertial drive can be used to drive the mirror 68. Indeed, either mirror can be driven by an electromechanical, electrical, mechanical, electrostatic, magnetic, or electromagnetic drive.

The slow-mirror is operated in a constant velocity sweep-mode during which time the image is displayed. During the mirror's return, the mirror is swept back into the initial position at its natural frequency, which is significantly higher. During the mirror's return trip, the lasers can be powered down in order to reduce the power consumption of the device.

Figure 6:
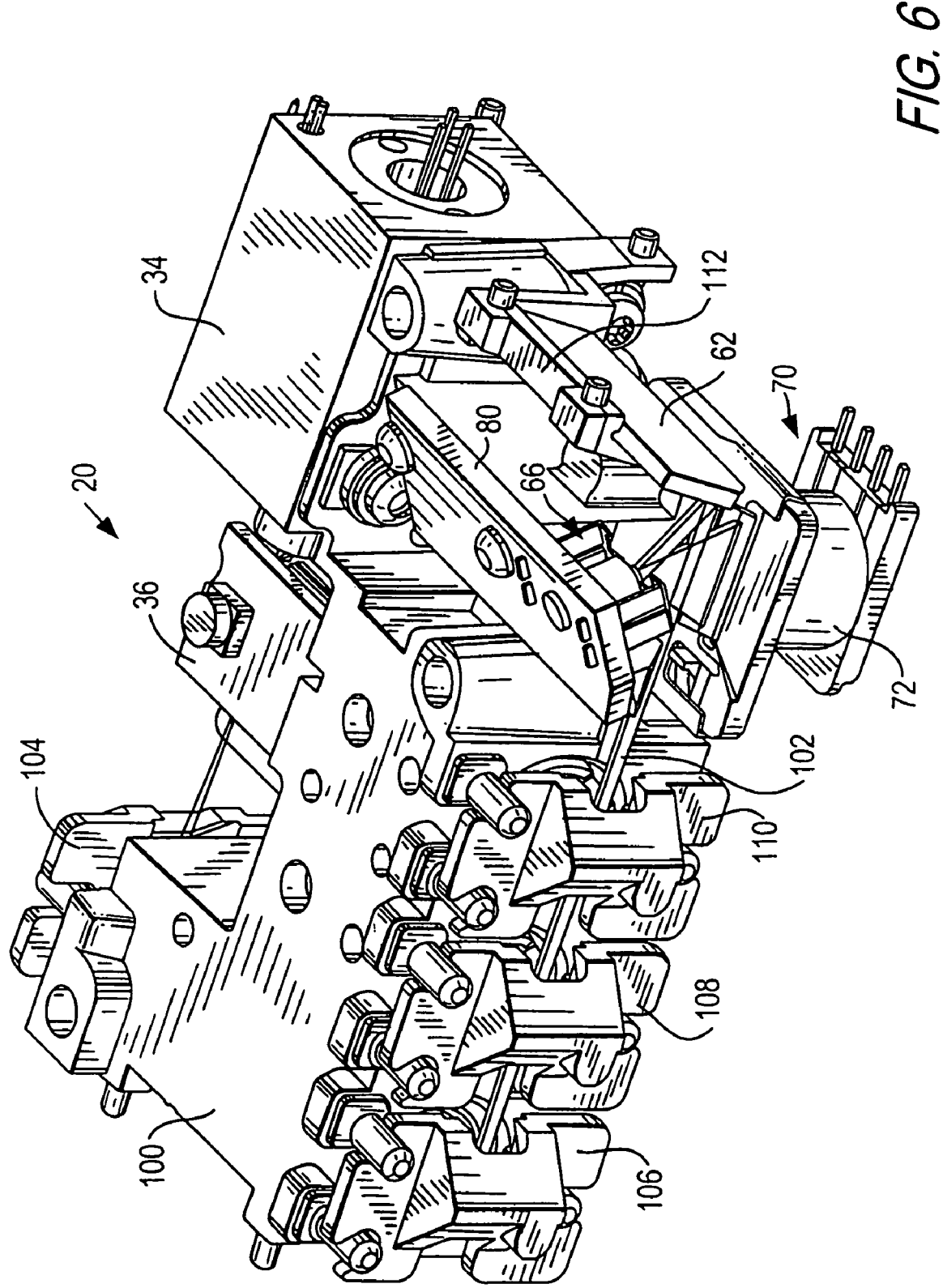
FIG. 6 is a perspective view of a practical implementation of the arrangement of FIG. 2.

FIG. 6 is a practical implementation of the arrangement 20 in the same perspective as that of FIG. 2. The aforementioned components are mounted on a support, which includes a top cover 100 and a support plate 102. Holders 104, 106, 108, 110, 112 respectively hold folding mirrors 42, 48, filters 52, 54 and fold mirror 62 in mutual alignment. Each holder has a plurality of positioning slots for receiving positioning posts stationarily mounted on the support. Thus, the mirrors and filters are correctly positioned. As shown, there are three posts, thereby permitting two angular adjustments and one lateral adjustment. Each holder can be glued in its final position.

The image is constructed by selective illumination of the pixels in one or more of the scan lines. As described below in greater detail with reference to FIG. 7, a controller 114 causes selected pixels in the raster pattern to be illuminated, and rendered visible, by the three laser beams. For example, red, blue and green power controllers 116, 118, 120 respectively conduct electrical currents to the red, blue and green lasers 22, 28, 34 to energize the latter to emit respective light beams at each selected pixel, and do not conduct electrical currents to the red, blue and green lasers to deenergize the latter to non-illuminate the other non-selected pixels. The resulting pattern of illuminated and non-illuminated pixels comprises the image, which can be any display of human- or machine-readable information or graphic.

Referring to FIG. 1, the raster pattern is shown in an enlarged view. Starting at an end point, the laser beams are swept by the inertial drive along the generally horizontal direction at the horizontal scan rate to an opposite end point to form a scan line. Thereupon, the laser beams are swept by the electromagnetic drive 70 along the vertical direction at the vertical scan rate to another end point to form a second scan line. The formation of successive scan lines proceeds in the same manner.

The image is created in the raster pattern by energizing or pulsing the lasers on and off at selected times under control of the microprocessor 114 or control circuit by operation of the power controllers 116, 118, 120. The lasers produce visible light and are turned on only when a pixel in the desired image is desired to be seen. The color of each pixel is determined by one or more of the colors of the beams. Any color in the visible light spectrum can be formed by the selective superimposition of one or more of the red, blue, and green lasers. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 7:
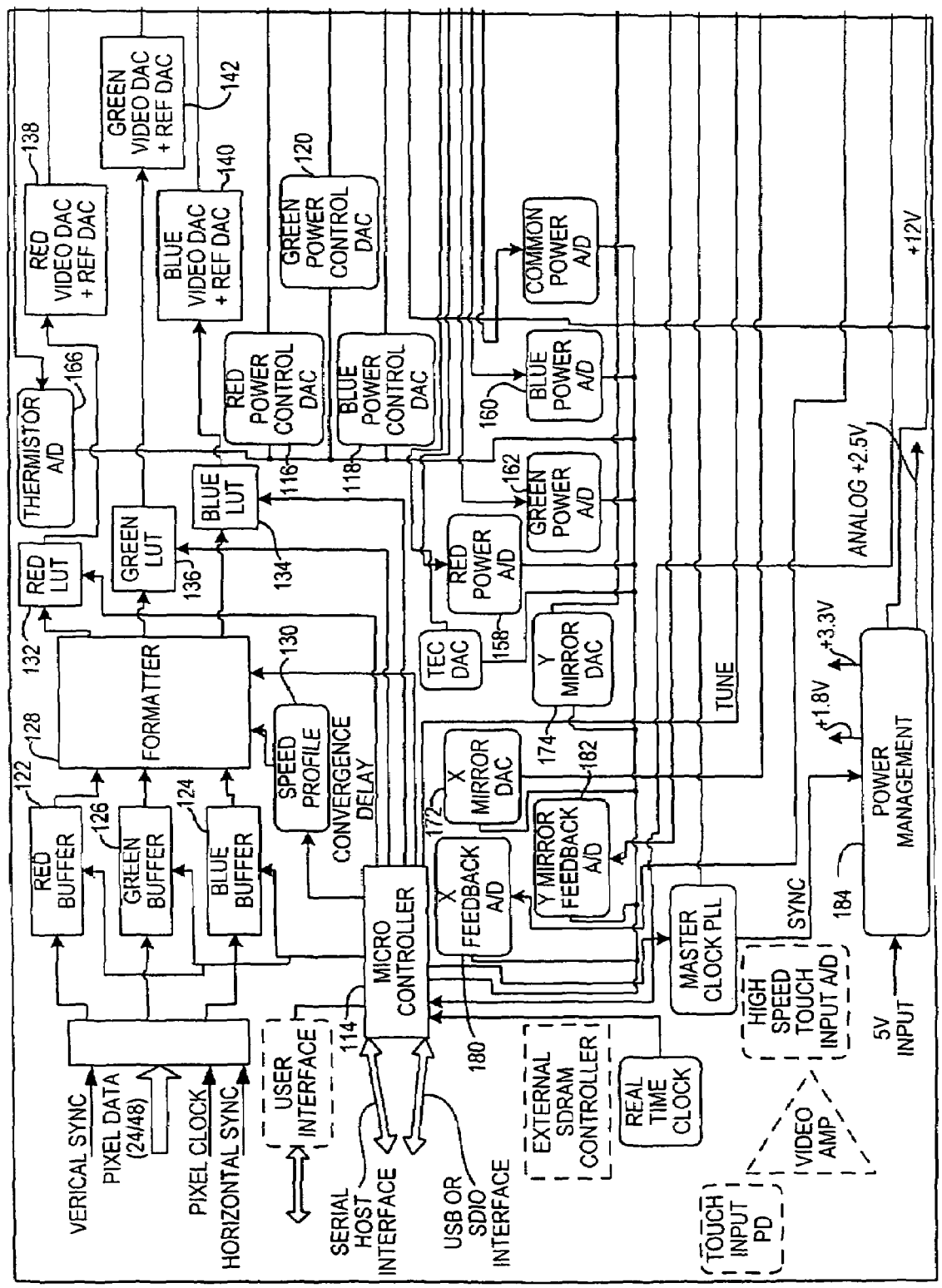
FIG. 7 is an electrical schematic block diagram depicting operation of the arrangement of FIG. 2.

As shown in FIG. 7, an incoming video signal having vertical and horizontal synchronization data, as well as pixel and clock data, is sent to red, blue and green buffers 122, 124, 126 under control of the microprocessor 114. The storage of one full VGA frame requires many kilobytes, and it would be desirable to have enough memory in the buffers for two full frames to enable one frame to be written, while another frame is being processed and projected. The buffered data is sent to a formatter 128 under control of a speed profiler 130 and to red, blue and green look up tables (LUTs) 132, 134, 136 to correct inherent internal distortions caused by scanning, as well as geometrical distortions caused by the angle of the display of the projected image. The resulting red, blue and green digital signals are converted to red, blue and green analog signals by digital to analog converters (DACs) 138, 140, 142. The red and blue analog signals are fed to red and blue laser drivers (LDs) 144, 146 which are also connected to the red and blue power controllers 116, 118. The green analog signal is fed to an acousto-optical module (AOM) radio frequency (RF) driver 150 and, in turn, to the green laser 34 which is also connected to a green LD 148 and to the green power controller 120.

Feedback controls are also shown in FIG. 7, including red, blue and green photodiode amplifiers 152, 154, 156 connected to red, blue and green analog-to-digital (A/D) converters 158, 160, 162 and, in turn, to the microprocessor 114. Heat is monitored by a thermistor amplifier 164 connected to an A/D converter 166 and, in turn, to the microprocessor.

The scan mirrors 64, 68 are driven by drivers 168, 170 which are fed analog drive signals from DACs 172, 174 which are, in turn, connected to the microprocessor. Feedback amplifiers 176, 178 detect the position of the scan mirrors 64, 68, and are connected to feedback A/Ds 180, 182 and, in turn, to the microprocessor.

A power management circuit 184 is operative to minimize power while allowing fast on-times, preferably by keeping the green laser on all the time, and by keeping the current of the red and blue lasers just below the lasing threshold.

A laser safety shut down circuit 186 is operative to shut the lasers off if either of the scan mirrors 64, 68 is detected as being outside of rated values.

It will be recalled that the inertial drive 66 oscillates the scan mirror 64 at a resonant frequency whose speed varies along each scan line. The scan mirror 64 has a maximum speed at the center of each scan line and a minimum speed at the ends of each scan line. The variable speed of the scan mirror 64 causes the pixels to have variable time durations in order to obtain pixels of the same size on the projection surface. The variable speed of the scan mirror 64 also causes the pixels to have a variable brightness, that is, the projected image appears brighter at those pixels where the scan mirror 64 has a slower speed. These variable time durations and the variable brightness are taken into account by a pixel mapping circuit depicted in FIG. 8 in order to project the image with uniformly sized pixels and uniform brightness.

Figure 8:
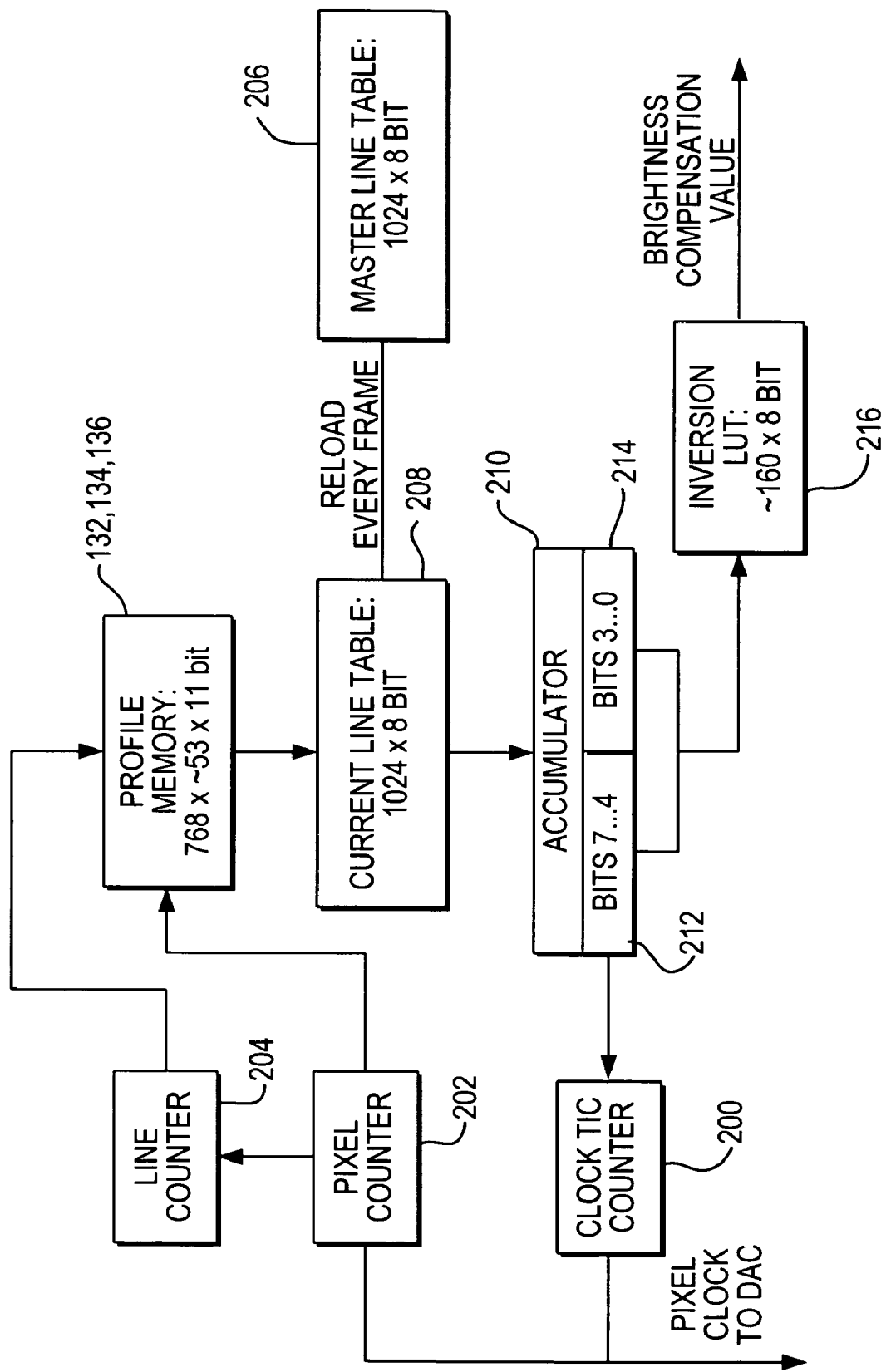
FIG. 8 is a schematic block diagram of a pixel mapping circuit used by the arrangement of FIG. 2.

As shown in FIG. 8, a clock 200 counts "tics", i.e., time intervals. The time duration of each pixel is measured by a plurality of such tics. For example, a pixel in the preferred embodiment can be measured as having from 3 to about 14 tics, and up to 16 tics per pixel can be stored for a high degree of precision. A pixel counter 202 counts the pixels on each scan line, and a line counter 204 counts the number of scan lines in the image to be projected. The pixel and line counters 202, 204 are connected to a profile memory that is advantageously embodied as the look-up tables 132, 134, 136 of FIG. 7. A master line table 206 is connected to a current line table 208 and its contents are reloaded every frame.

The output of the current line table 208 is connected to an 8-bit accumulator 210 having 4 upper bits for integer storage 212 and 4 upper bits for fractional storage 214, as described below. The output of the accumulator is inverted in an inversion look-up table 216 whose output is used for brightness compensation, as described below.

The duration of each pixel is not necessarily, and indeed is often not, an integer number of tics. Typically, the duration of a pixel is most precisely expressed as a number having a fractional remainder. One aspect of this invention is that the fractional remainder of a first pixel is stored in the fractional storage 214 of the accumulator, and is then taken into account for the next neighboring second pixel. The duration of the neighboring second pixel is either rounded up or down as the case may be. The contents of the accumulator after the duration of the second pixel has been determined are then taken into account for the third and for all successive pixels on a scan line.

During a calibration mode, the profile memory is mapped with the time durations of the pixels. There are various approaches. For example, the time durations can be stored only for a single representative scan line, for example, the center scan line, in which case, the stored time durations for the representative scan line are applied to all of the other scan lines; however, this leads to errors particularly at the upper and lower regions of the raster scan which are furthest from the center scan line. Alternatively, the time durations can be stored for all of the scan lines; however, this requires a multitude of storage locations for the profile memory.

Preferably, to minimize the memory storage requirement, the time durations are stored for a single scan line, such as the center scan line, and then only the differences with the adjacent scan lines are stored in succession for all the scan lines.

In further accordance with this invention, the stored time durations from the accumulator 210 are inverted (the brightness is inversely related to the time durations), and a brightness compensation signal is generated. This signal is then multiplied with the incoming video data to ensure that each pixel has the same brightness. The stored time durations from the accumulator 210 are not rounded for this purpose since the brightness jumps more precipitously when rounded time durations are used.

It will be understood that each of the elements described above, or two or more together, also may find a useful application in other types of constructions differing from the types described above.

While the invention has been illustrated and described as embodied in an arrangement for and a method of projecting an image with pixel mapping, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An image projection arrangement for projecting a two-dimensional image on a projection surface, comprising:
    a) a laser assembly for generating a laser beam;
    b) a scanner for sweeping the laser beam as a pattern of scan lines at a distance from the laser assembly on the projection surface, the scanner including a scan mirror movable at a speed that varies along each scan line, each scan line having a number of pixels, the pixels having respective time durations proportional to the variable speed of the scan mirror;
    c) a profile memory for storing the time durations of the pixels; and
    d) a controller operatively connected to the laser assembly, the profile memory and the scanner, for causing selected pixels along the scan lines to be illuminated for the time durations stored in the profile memory, and rendered visible, by the laser beam to produce the image.

2. The image projection arrangement of claim 1, wherein the laser assembly includes a plurality of lasers for respectively generating a plurality of laser beams of different wavelengths, and an optical assembly for focusing and nearly collinearly arranging the laser beams to form the laser beam as a composite beam which is directed to the scan mirror.

3. The image projection arrangement of claim 2, wherein the lasers include red and blue, semiconductor lasers for respectively generating red and blue laser beams.

4. The image projection arrangement of claim 3, wherein the lasers include a diode-pumped YAG laser and an optical frequency doubler for producing a green laser beam.

5. The image projection arrangement of claim 2, wherein the scan mirror is operative for sweeping the composite beam along a first direction at a first scan rate and over a first scan angle, and wherein the scanner includes another oscillatable scan mirror for sweeping the composite beam along a second direction substantially perpendicular to the first direction, and at a second scan rate different from the first scan rate, and at a second scan angle different from the first scan angle.

6. The image projection arrangement of claim 5, wherein at least one of the scan mirrors is oscillated by an inertial drive.

7. The image projection arrangement of claim 1, wherein the controller includes means for energizing the laser assembly to illuminate the selected pixels for the time durations stored in the profile memory, and for deenergizing the laser assembly to non-illuminate pixels other than the selected pixels.

8. The image projection arrangement of claim 1, and an accumulator for storing integer and fractional time durations of the pixels.

9. The image projection arrangement of claim 1, and an inversion table operatively connected to the accumulator for storing inverted time durations of the pixels, and for generating a brightness compensation signal.

10. An image projection arrangement for projecting a two-dimensional, color image on a projection surface, comprising:
    a) a support;
    b) a laser assembly including red, blue and green lasers on the support, for respectively emitting a plurality of red, blue and green laser beams;
    c) an optical assembly on the support, for optically focusing and collinearly arranging the laser beams to form a composite beam;
    d) a scanner on the support, for sweeping the composite beam in a pattern of scan lines at a distance from the support on the projection surface, the scanner including a scan mirror movable at a speed that varies along each scan line, each scan line having a number of pixels, the pixels having respective time durations proportional to the variable speed of the scan mirror;
    e) a profile memory for storing the time durations of the pixels; and
    f) a controller operatively connected to the lasers, the profile memory and the scanner, for causing selected pixels along the scan lines to be illuminated for the time durations stored in the profile memory, and rendered visible, by the composite beam to produce the image, the controller being operative for selecting at least some of the laser beams to illuminate the selected pixels for the time durations stored in the profile memory to produce the image with color.

11. The image projection arrangement of claim 10, wherein the scan mirror is operative for sweeping the composite beam along a first direction at a first scan rate and over a first scan angle, and wherein the scanner includes another oscillatable scan mirror for sweeping the composite beam along a second direction substantially perpendicular to the first direction, and at a second scan rate different from the first scan rate, and at a second scan angle different from the first scan angle.

12. The image projection arrangement of claim 10, and an accumulator for storing integer and fractional time durations of the pixels.

13. The image projection arrangement of claim 10, and an inversion table operatively connected to the accumulator for storing inverted time durations of the pixels, and for generating a brightness compensation signal.

14. An image projection arrangement for projecting a two-dimensional image on a projection surface, comprising:
   a) laser means for generating a laser beam;
   b) scanner means for sweeping the laser beam as a pattern of scan lines at a distance from the laser means on the projection surface, the scanner means including a scan mirror movable at a speed that varies along each scan line, each scan line having a number of pixels, the pixels having respective time durations proportional to the variable speed of the scan mirror;
   c) profile memory means for storing the time durations of the pixels; and
   d) controller means operatively connected to the laser means, the profile memory means and the scanner means, for causing selected pixels along the scan lines to be illuminated for the time durations stored in the profile memory means, and rendered visible, by the laser beam to produce the image.

15. An image projection module for projecting a two-dimensional image on a projection surface, comprising:
   a) a support;
   b) a laser assembly on the support, for generating a laser beam;
   c) a scanner on the support, for sweeping the laser beam as a pattern of scan lines at a distance from the support on the projection surface, the scanner including a scan mirror movable at a speed that varies along each scan line, each scan line having a number of pixels, the pixels having respective time durations proportional to the variable speed of the scan mirror;
   d) a profile memory for storing the time durations of the pixels; and
   e) a controller operatively connected to the laser assembly, the profile memory and the scanner, for causing selected pixels along the scan lines to be illuminated for the time durations stored in the profile memory, and rendered visible, by the laser beam to produce the image.

16. A method of projecting a two-dimensional image on a projection surface, comprising the steps of:
   a) generating a laser beam;
   b) sweeping the laser beam as a pattern of scan lines on the projection surface by moving a scan mirror at a speed that varies along each scan line, each scan line having a number of pixels, the pixels having respective time durations proportional to the variable speed of the scan mirror;
   c) storing the time durations of the pixels; and
   d) causing selected pixels along the scan lines to be illuminated for the stored time durations, and rendered visible, by the laser beam to produce the image.

17. The image projection method of claim 16, wherein the directing step is performed by generating a plurality of laser beams of different wavelengths, and the step of focusing and nearly collinearly arranging the laser beams to form the laser beam as a composite beam which is directed to the scan mirror.

18. The image projection method of claim 16, and storing integer and fractional time durations of the pixels.

19. The image projection method of claim 16, and storing inverted time durations of the pixels, and generating a brightness compensation signal.

* * * * *